(12) United States Patent
Bailey et al.

(10) Patent No.: US 10,565,792 B2
(45) Date of Patent: Feb. 18, 2020

(54) APPROXIMATING MESH DEFORMATIONS FOR CHARACTER RIGS

(71) Applicant: DreamWorks Animation LLC, Glendale, CA (US)

(72) Inventors: Stephen Bailey, Berkeley, CA (US); Paul DiLorenzo, La Verne, CA (US); David Otte, Palo Alto, CA (US); James O'Brien, El Cerrito, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 15/910,898

(22) Filed: Mar. 2, 2018

(65) Prior Publication Data

US 2019/0073826 A1    Mar. 7, 2019

Related U.S. Application Data

(60) Provisional application No. 62/555,572, filed on Sep. 7, 2017.

(51) Int. Cl.
   *G06T 17/20*      (2006.01)
   *G06T 13/40*      (2011.01)
   *G06T 7/73*       (2017.01)

(52) U.S. Cl.
   CPC ............. *G06T 17/205* (2013.01); *G06T 7/75* (2017.01); *G06T 13/40* (2013.01);
(Continued)

(58) Field of Classification Search
   CPC ....... G06T 17/205; G06T 17/20; G06T 13/40; G06T 7/75; G06T 2207/20081; G06T 2207/20084; G06T 2207/30196
   See application file for complete search history.

(56) References Cited

U.S. PATENT DOCUMENTS

2013/0088497 A1*    4/2013    DiLorenzo .............. G06T 13/80
                                                                                   345/473
2013/0329011 A1     12/2013    Lee et al.
(Continued)

OTHER PUBLICATIONS

European Patent Office Application Serial No. 18169689.9, Search Report dated Jan. 3, 2019, 15 pages.
(Continued)

*Primary Examiner* — Maurice L. McDowell, Jr.
(74) *Attorney, Agent, or Firm* — Lee, Hong, Degerman, Kang & Waimey PC

(57) ABSTRACT

Systems, methods, and computer-readable medium for approximating mesh deformations for character rigs are disclosed. An embodiment includes applying a first deformation function to one or more mesh elements to determine an intermediate position based on a transform to a first structural element, wherein the one or more mesh elements are assigned to the first structural element, generating an offset based on a second deformation function for the one or more mesh elements using a deformation function approximation model, wherein the offset is a positional offset of the one or more mesh elements from the intermediate position to a target position corresponding to the transform applied to the first structural element, and generating a combined mesh deformation for the one or more mesh elements by combining the intermediate position and the offset.

20 Claims, 9 Drawing Sheets

(52) U.S. Cl.
CPC ............... *G06T 2207/20081* (2013.01); *G06T 2207/20084* (2013.01); *G06T 2207/30196* (2013.01)

(56) References Cited

U.S. PATENT DOCUMENTS

| | | | | |
|---|---|---|---|---|
| 2014/0198107 A1* | 7/2014 | Thomaszewski | ....... | G06T 13/40 345/473 |
| 2018/0357747 A1* | 12/2018 | Young | ................... | G06T 3/0056 |
| 2019/0035132 A1* | 1/2019 | Dirksen | ................ | G10L 19/038 |

OTHER PUBLICATIONS

Guo, et al., "NeuroEnveloping: A Transferable Character Skin Deformation Technique", Proceedings of the 12th Pacific Conference on Computer Graphics and Applications (PG'04), Oct. 2004, 10 pages.

Loper, et al., "SMPL: A Skinned Multi-Person Linear Model", ACM Transactions on Graphics, vol. 34, No. 6, Article 248, Nov. 2015, 16 pages.

Bogo, et al., "Keep it SMPL: Automatic Estimation of 3D Human Pose and Shape from a Single Image", Jul. 2016, 18 pages.

Mohr, et al., "Building Efficient, Accurate Character Skins from Examples", ACM Transactions on Graphics, vol. 22, No. 3, Jul. 2003, 7 pages.

* cited by examiner

APPROXIMATING MESH DEFORMATIONS FOR CHARACTER RIGS

RELATED APPLICATIONS

Pursuant to 35 U.S.C. § 119(e), this application claims the benefit of U.S. Provisional Patent Application Ser. No. 62/555,572, filed on Sep. 7, 2017, the contents of which are hereby incorporated by reference herein in its (their) entirety.

BACKGROUND

Computer animation and other computer modeling applications combine two-dimensional (2D) or three-dimensional (3D) models of objects or characters and their corresponding programmed or keyframed movement. These models are constructed out of geometrical vertices, faces, and edges in a 3D coordinate system. One form of computer animation involves attaching a 3D model to a transformation hierarchy approximating a skeleton to dictate an object or a character's movement. The skeleton is surrounded by a surface mesh representing the object or character's boundaries. A 3D surface mesh may have a high level of resolution and include polygons, or faces, of various sizes making up the surface of the mesh, and the surface mesh may be shaped and deformed as required by an animator or other operator to achieve a desired result.

When comparing film-quality character rigs with ones designed for real-time applications, there is a clear difference in the quality of the mesh deformations. Real-time rigs are limited by a computational budget and often trade realism for performance. Rigs for film do not have this same limitation, and character riggers can make the rig as complicated as necessary to achieve realistic deformations.

Specifically, the level of detail included in character rigs for interactive applications such as video games and virtual reality is limited by computational constraints (e.g., a mobile device may have less processing power than a network of computer servers). These types of rigs need to run in real-time, and therefore need to be able to evaluate at rates that support user interactivity without excessive delay. Because of this limitation, the character rigs often lack a high level of realism. Film-quality character rigs, on the other hand, are not limited by computational constraints and their mesh deformations can appear much more realistic.

Because film-quality rigs require greater computational capacity, film-quality character rigs are not intended for interactive applications. A single film-quality rig may be able to run in real-time on high-end hardware after tremendous effort is spent to optimize and parallelize the rig evaluation. To increase the realism of interactive applications, it is desirable to use these high quality rigs but directly plugging computationally intensive rigs into an interactive application is impractical due to the interactive real-time requirements.

Thus, the existing systems and methods are unable to provide a solution for reducing the computation required for mesh deformations for film-quality rigs for use in real-time applications. Therefore, it is advantageous to determine mesh deformations for film-quality rigs (or near film-quality rigs) for use in real-time applications.

SUMMARY

Embodiments of the present disclosure include systems and methods for approximating mesh deformations for character rigs. Embodiments of the present disclosure lead to significant reduction in evaluation time compared with the original deformation computation of film-quality character rigs. Various embodiments of this disclosure include a data-driven approach to learn a computationally less expensive approximation for character rigs that compresses the computation enough such that film-quality rigs are able to be approximated in real-time interactive applications.

One embodiment includes learning the deformations from an existing rig by splitting the mesh deformation process into linear and nonlinear components. The linear deformations are computed directly from the transformations of the rig's underlying skeleton. The mesh deformations are assumed to be a function of the underlying skeleton of the character rig, and the skeleton is composed of bones each having an associated transformation matrix and translation vector. The remaining nonlinear components may be learned with deep learning methods.

In an embodiment, the linear transformation of each bone of a character skeleton is first applied to the vertices near the bone. Second, the remaining deformation is computed by applying offset vectors to points of the mesh after the linear transformation. These offsets are output by a set of neural networks that take the transformation matrices of each bone as input. Each vertex is assigned to a single bone based on how close the linear transformation of the bone moves the vertex to its target deformation location given by the deformation of the original character rig.

A neural network may be trained for each bone to output the offset between a particular vertex's position after the linear transformation and the vertex's ultimate target location. For each character, the neural networks are trained on a large set of example skeleton poses and mesh deformations, which are computed using the original character rig.

In one embodiment, the speed of the approximation may be increased by reducing the dimension of the input and output to each neural network. For each network associated with a single bone, the size of its input is reduced by identifying which subset of bones in the skeleton affect the deformation of any vertex in the neural network's output. Once that subset is identified, the network may be trained only on those bones instead of the full skeleton.

To reduce the size of the output for each network, in one embodiment, the offset vectors assigned to each bone are collected and principal component analysis may be run on each set of vertices separately. A small set of the principal components are selected that explains the most variance in the offset vectors from the training data. The network is then trained to output values for each principal component instead of the offset vectors directly. These values are then multiplied with the principal components to obtain the final offset vectors.

To use the approximation to compute the mesh deformations given a new skeleton, in an embodiment, the bone transformations are used to compute the linear component of the mesh deformation. Then for each network, the subset of bones that it was trained on is provided as input into the networks. The outputs of the networks are multiplied by the precomputed principal components and these offset vectors are added to the linearly deformed mesh to obtain the approximated deformation.

An embodiment of a method of the present disclosure for generating approximated mesh deformations of a model comprising one or more mesh elements and a first structural element of a plurality of structural elements includes applying a first deformation function to the one or more mesh elements to determine an intermediate position of the one or more mesh elements based on a transform applied to the first structural element, wherein the one or more mesh elements are assigned to the first structural element, generating an offset, based on a second deformation function, for the one or more mesh elements using a deformation function approximation model based on a learned weight value, wherein the offset is a positional offset of the one or more mesh elements from the intermediate position to a target position corresponding to the transform applied to the first structural element, and generating a combined mesh deformation for the one or more mesh elements by combining the intermediate position of the first deformation function and the offset of the second deformation function.

An embodiment of a machine-readable non-transitory medium of the present disclosure includes machine-readable non-transitory medium having stored thereon machine-executable instructions for generating approximated mesh deformations of a model comprising one or more mesh elements and a first structural element of a plurality of structural elements, wherein the instructions comprise applying a first deformation function to the one or more mesh elements to determine an intermediate position of the one or more mesh elements based on a transform to the first structural element, wherein the one or more mesh elements are assigned to the first structural element, generating an offset, based on a second deformation function, for the one or more mesh elements using a deformation function approximation model, wherein the offset is a positional offset of the one or more mesh elements from the intermediate position to a target position corresponding to the transform applied to the first structural element, and generating a combined mesh deformation for the one or more mesh elements by combining the intermediate position of the first deformation function and the offset of the second deformation function.

An embodiment of a terminal of the present disclosure for generating approximated mesh deformations of a model comprising one or more mesh elements and a first structural element of a plurality of structural elements comprises a display configured to display information and at least one controller configured to apply a first deformation function to the one or more mesh elements to determine an intermediate position of the one or more mesh elements based on a transform to the first structural element, wherein the one or more mesh elements are assigned to the first structural element, generate an offset, based on a second deformation function, for the one or more mesh elements using a deformation function approximation model, wherein the offset is a positional offset of the one or more mesh elements from the intermediate position to a target position corresponding to the transform applied to the first structural element, generate a combined mesh deformation for the one or more mesh elements by combining the intermediate position of the first deformation function and the offset of the second deformation function, and cause the display to display an approximated mesh deformation of the model corresponding to the generated combined mesh deformation.

An embodiment of a terminal of the present disclosure for generating approximated mesh deformations of a model comprising one or more mesh elements and a first structural element of a plurality of structural elements comprises means for applying a first deformation function to the one or more mesh elements to determine an intermediate position of the one or more mesh elements based on a transform to the first structural element, wherein the one or more mesh elements are assigned to the first structural element, means for generating an offset, based on a second deformation function, for the one or more mesh elements using a deformation function approximation model, wherein the offset is a positional offset of the one or more mesh elements from the intermediate position to a target position corresponding to the transform applied to the first structural element, means for generating a combined mesh deformation for the one or more mesh elements by combining the intermediate position of the first deformation function and the offset of the second deformation function, and means for displaying an approximated mesh deformation of the model corresponding to the generated combined mesh deformation.

Another method of the present disclosure for generating approximated mesh deformations of a model comprising a plurality of structural elements and a plurality of mesh elements, comprises associating a first mesh element of the plurality of mesh elements with a first structural element of the plurality of structural elements, applying a transformation to the first structural element from a rest position, identifying a linear deformation position of the first mesh element resulting from the transformation applied to the first structural element, generating weight values of a deformation approximation model associated with the first structural element based on determined target deformations of the one or more mesh elements given a plurality of poses of the model, wherein the deformation approximation model outputs an offset defined with respect to the first structural element, and storing the generated weight values and associations of the one or more mesh elements with the first structural element to permit an approximated combined mesh deformation of the model to be generated based on an intermediate position of the first deformation function using the stored associations and the offset of the second deformation function using the stored generated weight values, wherein the offset defines a deformation of the one or more mesh elements from the linear deformation position to a target deformation position of the one or more mesh elements corresponding to the transformation applied to the first structural element.

An embodiment of a machine-readable non-transitory medium of the present disclosure includes machine-readable non-transitory medium having stored thereon machine-executable instructions for generating approximated mesh deformations of a model comprising a plurality of structural elements and a plurality of mesh elements, wherein the instructions comprise associating a first mesh element of the plurality of mesh elements with a first structural element of the plurality of structural elements, applying a transformation to the first structural element from a rest position, identifying a linear deformation position of the first mesh element resulting from the transformation applied to the first structural element, generating weight values of a deformation approximation model associated with the first structural element based on determined target deformations of the first mesh element given a plurality of poses of the model, wherein the deformation approximation model outputs an approximation modifier defined with respect to the first structural element, and storing the generated weight values and associations of the one or more mesh elements with the first structural element to permit an approximated combined mesh deformation of the model to be generated based on an intermediate position of the first deformation function using the stored associations and the offset of the second deformation function using the stored generated weight values, wherein the offset defines a deformation of the one or more mesh elements from the linear deformation position to a target deformation position of the one or more mesh elements corresponding to the transformation applied to the first structural element.

An embodiment of a terminal of the present disclosure for generating approximated mesh deformations of a model comprising a first mesh element and a first structural element of a plurality of structural elements comprises a display configured to display information and at least one controller configured to associate a first mesh element of the plurality of mesh elements with a first structural element of the plurality of structural elements, apply a transformation to the first structural element from a rest position, identify a linear deformation position of the first mesh element resulting from the transformation applied to the first structural element, generate weight values of a deformation approximation model associated with the first structural element based on determined target deformations of the first mesh element given a plurality of poses of the model, wherein the deformation approximation model outputs an approximation modifier defined with respect to the first structural element, and causing a memory to store the generated weight values and associations of the one or more mesh elements with the first structural element to permit an approximated combined mesh deformation of the model to be generated based on an intermediate position of the first deformation function using the stored associations and the offset of the second deformation function using the stored generated weight values, wherein the offset defines a deformation of the one or more mesh elements from the linear deformation position to a target deformation position of the one or more mesh elements corresponding to the transformation applied to the first structural element.

An embodiment of a terminal of the present disclosure for generating approximated mesh deformations of a model comprising a first mesh element and a first structural element of a plurality of structural elements comprises means for associating a first mesh element of the plurality of mesh elements with a first structural element of the plurality of structural elements, means for applying a transformation to the first structural element from a rest position, means for identifying a linear deformation position of the first mesh element resulting from the transformation applied to the first structural element, means for generating weight values of a deformation approximation model associated with the first structural element based on determined target deformations of the first mesh element given a plurality of poses of the model, wherein the deformation approximation model outputs an approximation modifier defined with respect to the first structural element, and means for storing the generated weight values and associations of the one or more mesh elements with the first structural element to permit an approximated combined mesh deformation of the model to be generated based on an intermediate position of the first deformation function using the stored associations and the offset of the second deformation function using the stored generated weight values, wherein the offset defines a deformation of the one or more mesh elements from the linear deformation position to a target deformation position of the one or more mesh elements corresponding to the transformation applied to the first structural element.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference may be made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

While this disclosure is presented in the context of 3D animation applications, it is not limited thereto, and other implementations of the systems, media, and methods described herein are contemplated, including deformation of geometric models within a 2D or 3D coordinate system, as well as for various interactive geometric modeling applications involving production and modification of geometric models, including, but not limited to, rigging, animation, architecture, automotive design, consumer product design, virtual reality applications, augmented reality applications, game development, visual effects, 3D printing, and the like. Any reference in this disclosure to a geometric model or components thereof, within a 3D model or 3D space will be understood to include the disclosure as applicable to 2D models and 2D spaces.

In this disclosure, the term "character," "object," or "model" may include any suitable computer representation or geometric model of part or all of an entity, such as a character, a landscape, an inanimate object, or any other virtual, modeled, and/or animated entity. Objects may be constructed, for example, out of geometrical vertices, edges, and/or faces in a 2D or 3D coordinate system.

A "point," "vertex," "edge," or "component" may include one of a set of elements used to determine the shape, movement, appearance, and/or absolute or relative positioning of a 3D model, including but not limited to vertices, points, edges, and faces of a 2D or 3D model. Any description of the present disclosure with respect to one of a point, a vertex, an edge, or a face will be understood to apply equally and/or analogously to the others of a point, a vertex, an edge, or a face where applicable, as will be understood by one of ordinary skill in the art, and use of one term over another within this disclosure will not be deemed to be limiting to only the term being used.

Figure 1A:
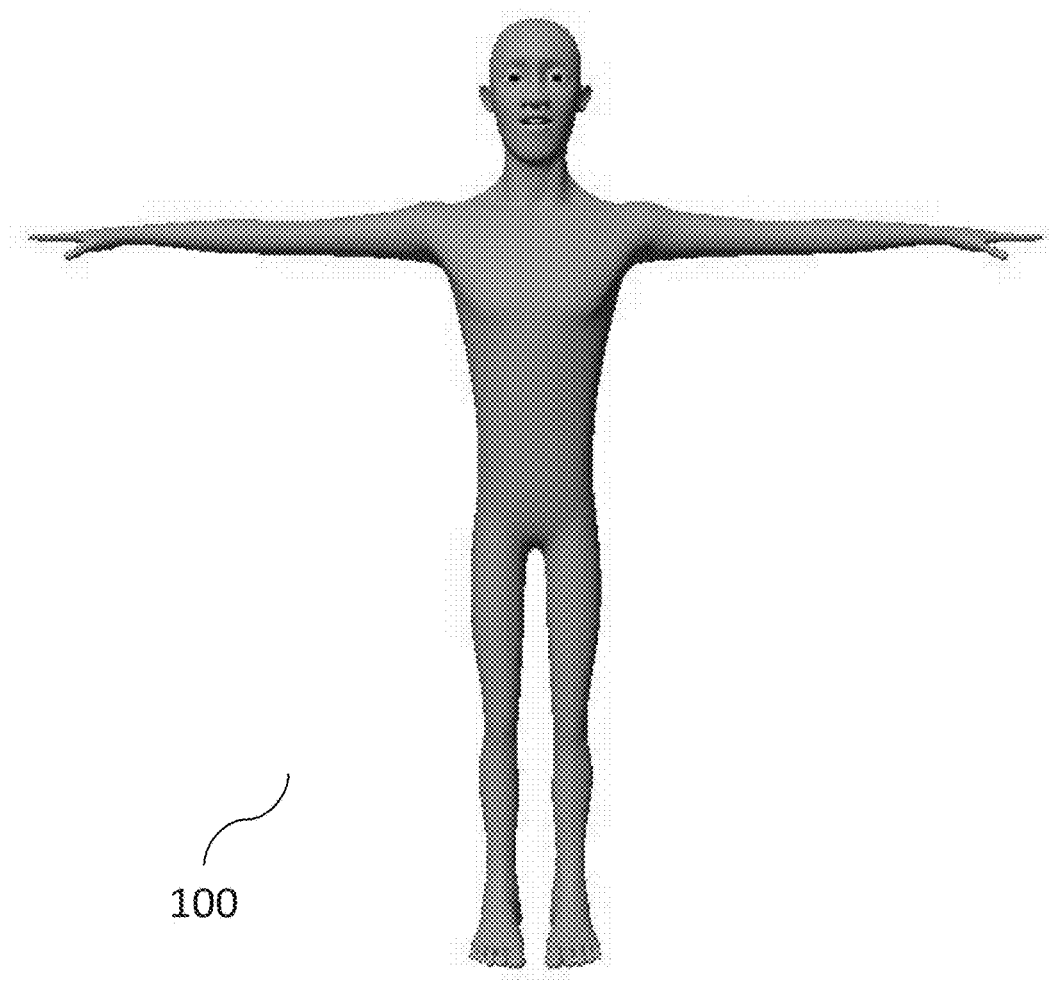
FIGS. 1A and 1B are illustrations of a mesh of a character model as discussed with respect to embodiments of the present disclosure.
Figure 1B:
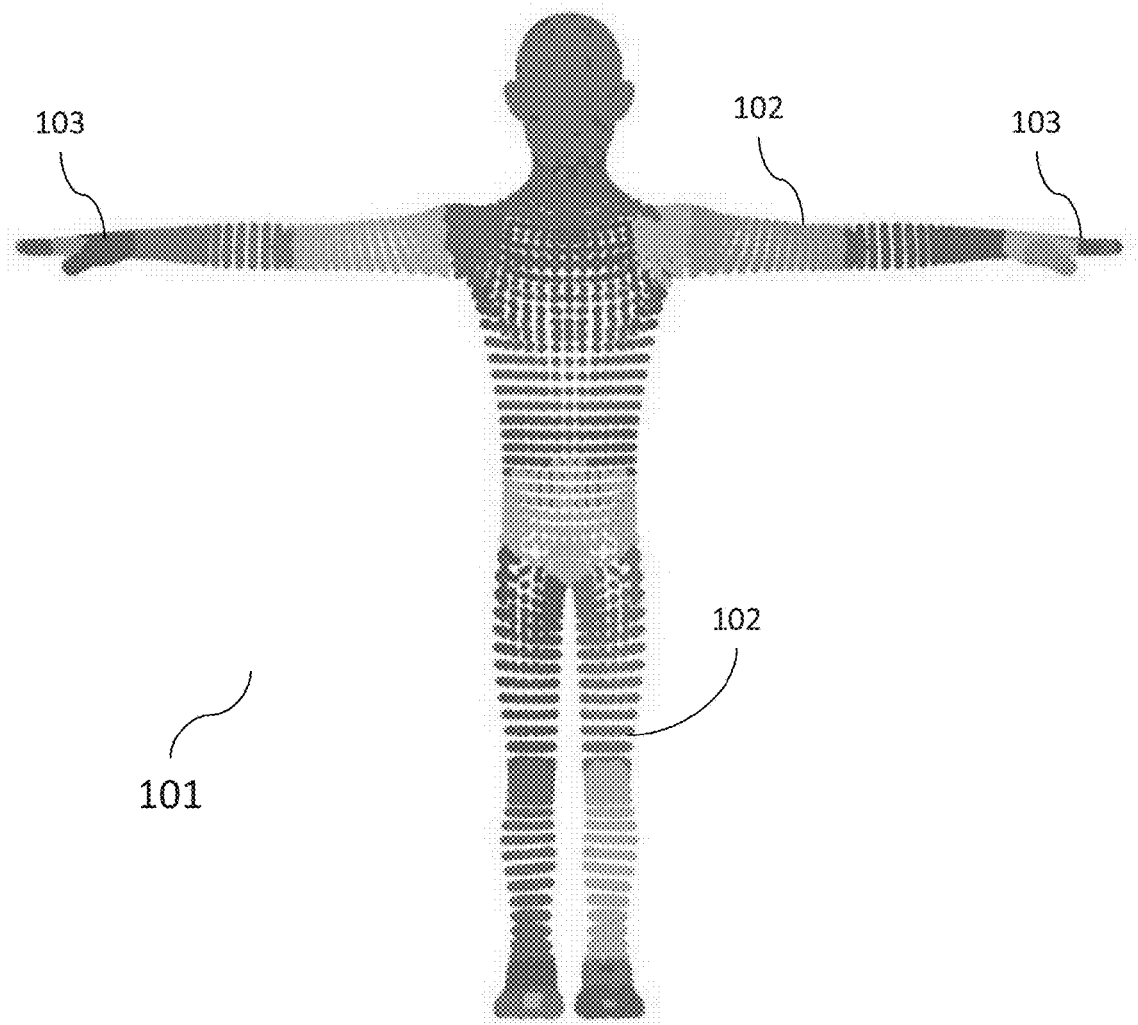

By way of background, most character rigs are designed with a motion system and a deformation system. The motion system is responsible for mapping rig parameters for some pose to a skeleton composed of bones and joints. The deformation system then maps the skeleton to the final mesh of the character for the input pose. FIG. 1A depicts an example of a 3D character 100 in a rest pose, or a "T" pose in this case, which may be configured to a rig. The rig may comprise skeletal bones and joints that provide points allowing for control and articulation by an artist or other operator. FIG. 1B shows an example of points, or vertices, of a character mesh 101 corresponding to the 3D character depicted in FIG. 1A.

As discussed, in film-quality character rigs, computing power and computing runtime are not heavily constrained and thus full calculations of deformations of the mesh are possible based on an artist or animator's articulation of the rig to achieve a desired final outcome of a character. However, these computationally intensive rigs intended for film-quality applications cannot provide accurate and effective deformation calculations under real-time processing conditions, which require significantly less computational resources and computing time. Some efforts to speed up deformation calculations have involved fitting a bone structure to a series of mesh animations and optimizing the bone influences for each vertex to best reconstruct the original animation, however new animations cannot quickly be fitted to the rigs because the bones are optimized for a specific set of deformations. The present disclosure addresses this by providing the ability to approximate mesh deformations in real-time using machine learning.

Figure 2A:
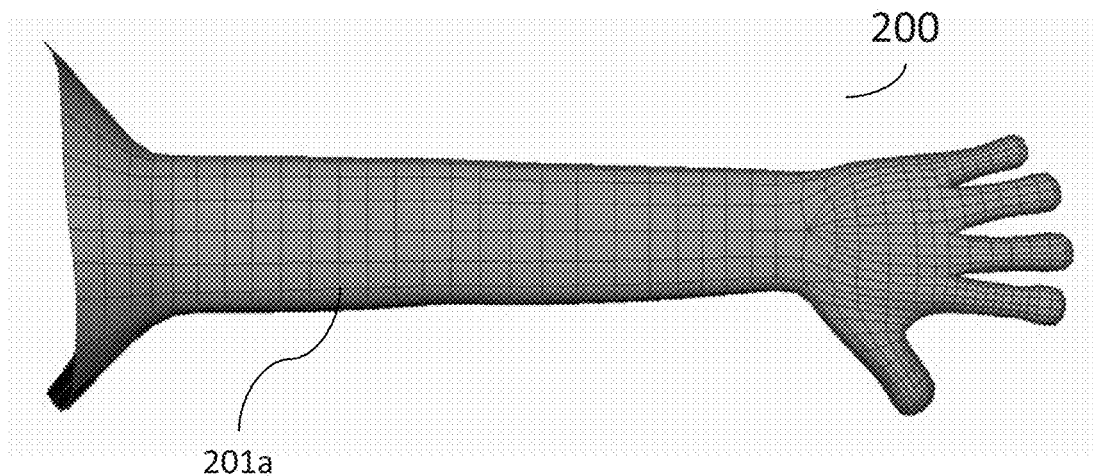
FIGS. 2A and 2B are illustrations of a mesh of a character arm according to an embodiment of the present disclosure.
Figure 2B:
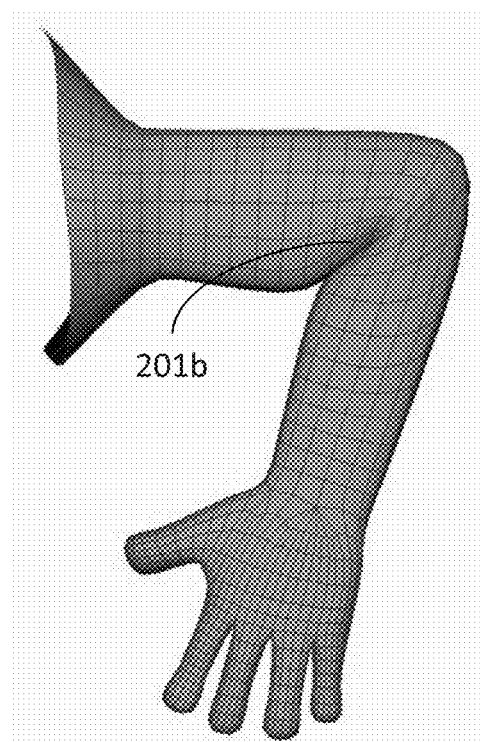

FIG. 2A is a simplified example of an arm region 200 of a character mesh in rest pose, in which the vertices of the mesh are represented by intersections of the surface lines depicted in the figure. Articulation of the arm by bending the arm at the elbow joint should preferably result in deformation of vertices of the mesh near the elbow to represent natural bulging, compression, and/or displacement of skin and muscles of the character, particularly for the vertices at the inner arm region, for example mesh vertex 201a in the rest pose position of FIG. 2A and corresponding mesh vertex 201b in the deformed position as shown in FIG. 2B. FIG. 2B may represent a final deformation achieved by calculating the full mesh function utilizing high performance computing hardware given unlimited (or extensive) time resources, and may be referred to as the "original deformation function" or "ground truth" deformation for the purposes of this discussion.

In an aspect, techniques such as linear blend skinning computes deformation of a mesh from a rest pose as a weighted sum of the skeleton's bone transformations applied to each vertex. However, these deformations can suffer from volume loss known as the "candy wrapper" problem, and there are particular deformations which cannot be achieved with these techniques, for example, skin slide, muscle bulges, and cloth wrinkles.

To achieve optimized deformation calculations suitable for a real-time environment, approximation of non-linear deformations are used in embodiments of the present disclosure that combine linear deformations with each vertex assigned to a corresponding bone of the existing underlying skeleton with approximations of non-linear deformations using offset vectors determined by a set of neural networks that take the transformation matrices of each bone as input. Utilizing the underlying skeleton of the rig allows new skeletal motion to be easily applied to the rig and allows for more general deformations.

Figure 3:
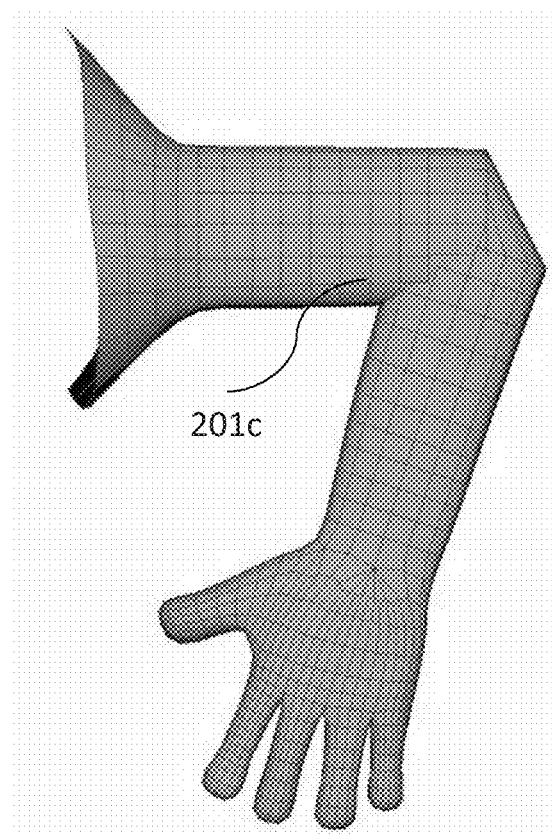
FIG. 3 is an illustration of a mesh of the character arm of FIG. 2 according to an embodiment of the present disclosure.

Referring now to FIG. 3, an example of a deformation of the character mesh of FIGS. 2A, 2B is shown when only linear deformations are applied to the vertices using the transform of the underlying bone. As can be seen in FIG. 3, the linear deformation results in interior intersection at the inner elbow region as well as unnatural deformation at the inner forearm and bicep due to lack of muscle compression and bulging and unnatural deformation at the outer elbow due to the application of the skeleton bone transformation being linearly applied to its corresponding vertices. In embodiments of this disclosure, a similar linear deformation based on the underlying skeleton bone transformation using techniques such as rigid skinning is combined with non-linear deformation approximations output by neural networks trained using transformation matrices of each bone, as will be discussed further.

This disclosure focuses on determining approximations for the rig evaluation function given a character's bone transformation (rotation and/or translation) information as input. A rig function r(p) maps a set of artist-level rig parameters, denoted with p, to a deformed polygonal mesh. In some embodiments, the topology of the mesh is constant for all possible parameters p, thus the rig function is expressed as V=r(p), where V is a list of the vertex positions in the mesh.

In an embodiment, the skeleton S of the character is computed. The skeleton's configuration is specified by a set of linear transformations and translations for each bone in the skeleton. Specifically, for a skeleton with m bones, $S=[X_1, t_1, X_2, t_2, \ldots, X_m, t_m,]$ where $X_j$ is the 3×3 linear transformation matrix of bone j and $t_j$ is the translation of bone j. The transformations and translations are expressed in a global coordinate frame.

Embodiments of this disclosure consider the rig function as a composition of two functions: a skeletal motion system mapping rig parameters to a skeleton and a deformation system mapping a skeleton to vertex positions. The skeletal motion system is denoted by S=m(p), and the deformation system is denoted by V=d(S). Combining these two systems, the rig function can be expressed as r(p)=(d·m)(p).

This disclosure is thus focused on approximating the deformation function d(S) and a given input of internal skeleton information of the character, including bones and joints and transformations thereof, may be assumed for the purposes of this discussion. Embodiments of the present disclosure approximate the deformation function d(S) by decomposing the function into two parts: a linear computation and a nonlinear computation. The linear portion uses the rigid rotations to deform the vertices in the mesh according to the bone transformations in the skeleton. The resulting mesh from the linear portion may be substantially different from the target mesh V=d(S). Thus embodiments of the present disclosure include a nonlinear component utilizing a universal function approximator to estimate the remaining residual error between the mesh obtained from the rigid rotations and the target mesh. In one embodiment, the nonlinear function approximator learns from a set of randomly generated skeletons and correspondingly deformed meshes that are precomputed or computed offline using the rig function r(p).

The linear deformation may be applied directly from the input skeleton by multiplying the vertices in the mesh with the bone transformation matrices. In one embodiment of the present disclosure, each vertex of a character mesh is assigned to a single bone of a skeleton which best matches the vertex's deformation across multiple poses. To achieve this, the ground truth deformations for the vertices resulting from a set of a large number of poses are obtained. The set of poses may consist of random poses of the character, or they may consist of a wide range of predefined poses of the character, or a combination of both in some embodiments.

Based on this set of ground truth deformations of each vertex, linear deformations of each vertex are evaluated with respect to transforms of each bone, within the large number of random poses used for obtaining the ground truth deformation values. A single bone is then identified for each vertex of the character mesh which results in the linear deformation of the vertex achieving a closest deformation—or smallest margin of error—as compared with the vertex's ground truth deformation for the same pose. Each vertex is thus assigned to a single corresponding bone.

Vertex/bone assignments may be determined using a large set of poses of the character. The large set of poses may correspond to randomized poses of the character. In other embodiments, the poses may be based on a number of predefined poses of the character that cover a full range of movement or combinations of movement of each component of the character. In yet other embodiments, the poses used to determine vertex/bone assignments may include both randomized and predefined poses of the character.

Specifically, to assign a vertex k to a bone $b_k$, a mesh in a rest pose $V^0$ is considered with the corresponding skeleton $S^0$. The linear deformation by a new skeleton S for vertex k may be expressed as:

$$\hat{d}_k(S) = X_{b_k}(x_{b_k}^0)^{-1}(v_k^0 - t_{b_k}^0) + t_{b_k}$$

where $x_{b_k}^0$ and $t_{b_k}^0$ are the transformation matrix and translation vector for bone $b_k$ in the skeleton $S^0$ of the rest pose, and $v_k^0$ is the position of vertex k in the mesh of the rest pose.

For each vertex in the rest pose, embodiments of the present disclosure identify the bone that best explains the vertex's linear deformation across a set of example poses. The bone assignment $b_k$ is determined by iterating through each bone assignment for a vertex for the set of example poses. Then, of the example poses, the bone which minimizes the least squares error of the rigid transformation of the vertex by the bone is selected for assignment to the vertex.

Bone assignments for each vertex of the mesh may be precomputed and stored for later retrieval and use. As shown in FIG. 1B, neighboring vertices of a mesh will often be grouped and assigned to the same bone of the skeleton. Additionally, a larger number of vertices 102—or vertices covering a wider area of the mesh—may be assigned to larger bones of the skeleton with less articulation detail (for example large bones of the arms and legs) whereas a smaller number of vertices 103—or vertices covering a smaller area of the mesh—may be assigned to smaller bones with greater articulation detail, for example smaller bones of the wrists, hands, and fingers.

Visually, linear approximation may be sufficient for vertices near the middle of a particular bone, for example, the vertices located at the middle of the forearm in FIG. 3 that have been subjected to linear transformation may be located in a position that is to the ground truth deformation for the same pose. However, the linear approximation is likely to produce undesired results for vertices that are located near the end of bones and near joints. As discussed with respect to FIG. 3, the vertices near joints—such as the elbow—may be stretched, compressed, and/or deformed by d(S) to preserve the volume of the mesh. The deformations of vertices near joints may not be accomplished by linear deformation based techniques alone. Thus, embodiments of the present disclosure combine the above linear approximation with approximations of non-linear deformations using deep learning techniques.

The non-linear deformation of a vertex for a particular bone transform refers to the deformation of the vertex from the linear deformation associated with the bone transform to the ground truth deformation of the particular transform. In other words, the non-linear deformation may correspond to the difference between the vertex's ground truth deformation and the vertex's position resulting from the linear transformation.

For example, for mesh vertex 201a shown in FIG. 2A, the linear deformation of the vertex is point 201c as shown in FIG. 3. However, due to the vertex's position near the elbow joint, the linear deformation position of the vertex and the ground truth deformation of the vertex, shown by vertex 201b as shown in FIG. 2B, will differ, and the difference from 201c to 201b represents the non-linear deformation which is approximated by embodiments of the present disclosure.

The non-linear approximations are based on the position of the vertex resulting from the linear deformation, thus the non-linear deformation of the vertex is defined locally with respect to its corresponding bone having been subject to the transform. For example, the deformation of a vertex on a character's arm may be expressed as a function of the arm and shoulders. Global rotation and translation of the mesh should not affect non-linear deformation of the arm, nor should the configuration of a character's leg affect the deformation of the hand. With the deformation expressed locally, the non-linear deformation of each vertex may depend on nearby bones in the skeleton. As a consequence, each vertex may depend on a smaller subset of bones from the input skeleton, which reduces the number of inputs into the non-linear deformation function and simplifies the deep learning requirements of the function.

Thus, the non-linear deformation function for vertex k is defined by the following equation:

$$f_k(S) = (x_{b_k})^{-1}(d_k(S) - t_{b_k}) - (X_{b_k}^0)^{-1}(v_k^0 - t_{b_k}^0)$$

where $d_k(S)$ is the position of vertex k as computed from the original rig deformation function. The above equation removes the transformation of the rest pose from the vertex $v_k^0$ and the transformation of the deformed pose from the deformed vertex $d_k(S)$. The difference of these two positions equates to the non-linear deformation of the vertex in the local coordinate space of bone $b_k$. In other words, as discussed above, the non-linear deformation of the vertex is identified by determining the difference between the position of the vertex from the linear deformation and the ground truth deformation of the vertex given the same bone transformation input. By expressing the deformation in the defined space of the vertex's assigned bone, this value may be invariant to global changes of the skeleton as well as to changes of parts of the skeleton that do not directly cause any deformation of the vertex.

In an aspect, the deformation function may be expressed using the following equation:

$$d_k(S) = X_{b_k}((X_{b_k}^0)^{-1}(v_k^0 - t_{b_k}^0) + f_k(S)) + t_{b_k}$$

Thus, the closer the approximation of the function $f_k(S)$ the better the approximation deformation function will be. The approximation is denoted with model parameters θ, which include values determined from training neural networks to learn deformation approximations for each bone (discussed further below), as $n_k(S; θ) \approx f_k(S)$, and the deformation approximation $\tilde{d}_k(S; \theta)$ can be expressed as the sum of the linear and nonlinear functions:

$$\tilde{d}_k(S;\theta) = \bar{d}_k(S) + X_{b_k} n_k(S;\theta)$$

The optimal model parameters $\hat{\theta}$ are estimated by minimizing the squared error loss over a set of n training examples:

$$\hat{\theta} = \arg\min_{\theta} \sum_{i=1}^{n} \| d_k(S^i) - \tilde{d}_k(S^i; \theta) \|^2$$

In an aspect, instead of using one function approximator per vertex, the vertices may be grouped into subsets and a function approximator is trained to output each vertex in the subset. Thus, subsets of vertices which are positioned sufficiently proximate to one another are grouped together in order to reduce computations as compared to training a function approximator for each individual vertex. This results in fewer neural networks utilized, thereby reducing the number of computations performed and minimizing execution time. The vertices of the mesh are separated into subsets $P_i$ based on the bones that they are assigned to in order to take advantage of the local deformation defined in $f(S)$, such that where $P_i$ is the subset of all vertices k, such that each vertex of the subset is assigned to bone i, shown by set notation: $P_i = \{k | b_k = i\}$.

In some embodiments a neural network may be trained to learn deformation approximations for each bone of the skeleton separately. In some embodiments, one neural network may be trained for one bone of the skeleton, however other embodiments are considered wherein a combination of two or more bones are used to train one neural network where the two or more bones meet a particular similarity criteria in the resulting deformations. In an example where one neural network is trained on one bone, for each set, $P_i$ a neural network may be trained to approximate the deformations for the vertices only in that set. By dividing the vertices into sets this way, the non-linear deformations for vertices in some set $P_i$ are defined in the same coordinate system, thus aiding the training of the neural network to learn the deformation function.

In one embodiment, feed-forward neural networks may be used for learning the deformation approximations corresponding to the separate bones. Feed-forward neural networks are universal function approximators and may be well-suited for approximating the non-linear deformation component of the rig function. However, other embodiments are considered which utilize other machine learning techniques and/or other types of neural networks, including without limitation, Gaussian processes, regulatory feedback neural networks, radial basis function neural networks, recurrent neural networks, and the like. It will be understood by one of ordinary skill in the art that other types of deep learning and machine learning techniques may be implemented with the present disclosure for approximating the non-linear deformation component of the rig function given the ground truth deformation information.

In the example of feed-forward neural networks, the neural network may be composed of a series of dense layers where the output $x_{i+1}$ of layer i is used as the input of the next layer. The output for some layer i is computed as follows:

$$x_{i+1} = f(W_i x_i + b_i)$$

where $W_i$ and $b_i$ are unknown parameters that are learned when the model is trained. The function $f(x)$ is a nonlinear function applied element-wise to the components of the input vector.

Accordingly, given a set of vertices $P_i$ with each vertex assigned to bone i, a neural network is utilized to approximate the function $f_{p_i}(S)$ for that set of vertices. The output of a trained neural network may contain 3 values per vertex in the form of an offset vector, and in some examples, there may be on the order of hundreds of vertices that each model approximates. In an embodiment, if there are n number of bones in the skeleton, then n number of neural networks may be implemented, one for each bone. However, this disclosure considers other embodiments wherein less than or more than n number of neural networks is used.

In an embodiment where n number of neural networks is implemented, each network may only be responsible for learning the deformations specific to the vertices around that particular bone, and the neural network may thus be required to learn only the local deformation which may depend only on the transformations of a subset of the character's bones as defined by the skeleton hierarchy. Since each deformation depends on fewer bones local to a particular transformation, the neural networks are able to be trained to better approximate the deformations due to the deformation function depending on a lower dimensional input space.

The neural networks may be trained on a large set of poses of the character. For each pose, the ground truth deformation for each vertex is determined to develop the training data for the neural networks. In some embodiments, the training data may be based on a large number of randomized poses of the character. In other embodiments, the training data may be based on a number of predefined poses of the character which cover a full range of movement or combinations of movement of each component of the character. In yet other embodiments, the training data may include both randomized and predefined poses of the character.

In one example, each neural network may be trained with two hidden layers and a dense output layer. In the example, the hidden layers use the tan h nonlinearity, and the output layer is a dense linear layer. Each network may be trained on inputs of the local bone transformation matrices and the local translation vectors. Since the non-linear deformation is defined locally with respect to the local bone transformation, the networks may be trained using transformation information defined in a local coordinate system as well. Accordingly, the input to the neural network may include the translation and rotation of the bone with respect to the coordinate system of the parent bone. This allows transformation information to be defined with respect to the local coordinate system of the bone instead of a global coordinate system applicable to the entire skeleton with respect to a particular fixed point, for example. As known to those of ordinary skill in the art, each bone of the skeleton—with the exception of a root bone—is associated with a parent bone, wherein the hierarchy of bones is provided by the skeleton. For example in some cases, the root bone may correspond to a character's hip bone.

The transformation matrix for bone j with parent p is given as $X_p^{-1} X_j$, and the translation vector is given as $X_p^{-1}(t_j - t_p)$. The root bone is not provided as an input. In total, in the example, each bone contributes 12 inputs to the model. Given some skeleton S and a corresponding deformed mesh V, the non-linear deformation function $f(S)$ may be computed and the model is trained to output this function. In one embodiment, the models may be trained using an optimization method, such as the Adam optimization method.

In some embodiments, regularization may be used to help prevent the model from overfitting the training data. However, overfitting can also be avoided by training on infinite (or a very large amount of) data. In some embodiments, it may be assumed that access to the rig deformation function d(S) is available and can infinitely sample the function, which provides access to infinite data. In practice, evaluating the rig function takes time, and when new data is generated for each training iteration, most of the computation time may be spent evaluating the rig function. Instead of constantly generating new data, in some embodiments, generating on the order of 10,000 to 50,000 training samples may be sufficient to avoid overfitting.

The choice of training data is important to ensure accuracy of the rig approximator. In some embodiments, if the training set includes a large range of motion with extreme poses such as arms of a character rotated into the torso or body parts stretched to twice their length, these types of poses would represent large deformations that the approximator would also need to learn. As a result, the neural network would learn these large deformations while sacrificing accuracy for smaller deformations. However, high accuracy for smaller deformations may be preferred because they are more likely to be encountered during test time.

In one embodiment, a data set is created that contains all of the probable poses while avoiding poses with large deformations. First, each joint in the skeleton is considered independently. For each joint, a reasonable range of motion may be identified for the rotation and scaling. For example, the range of the knee joint from 150 to 0 degrees may be manually specified. A range for each joint in the skeleton may be defined and new poses may be generated by randomly sampling independently from each joint range. Each value may be sampled from a Gaussian distribution with 1.5 standard deviation aligned with the specified range, and values that lie outside of the range may be re-sampled. This sampling ensures that the full range of motion for each joint is contained in the training set. Samples near the ends of the range of motion occur in the data set less frequently. If it is assumed that poses near the ends of the joint range create poses that an animator typically will not use, then because there are fewer of these examples in the training set, the approximator will focus on learning the deformations near middle of the range of motion.

However, it will be understood that the training data should not be limited to only artist rendered poses which are likely to be used in live animation. As deformations from the training data are learned locally—and each neural network is concerned only with learning the deformation of a subset of vertices with respect to a single corresponding assigned bone—the pose of the entire character may be disregarded in generating the training data such that a large number of random poses may be used, even where the resulting character pose is improbable, or physically impossible for a realistic character. Thus, the training data may be generated by considering all control sets that may be used by an animator and generating random values for each control set independently as discussed above until an entire range of motion is achieved for each component of the character rig. In some embodiments, the training data may be based on a high number of poses of the character rig, up to between 10,000 to 40,000 random poses in some cases. However, it will be understood that these are only exemplary and the number of poses may be smaller or larger.

Based on the training data, a set of weights may be determined to maximize accuracy of the deformation approximation model for the assigned bone. In some embodiments, the set of weights resulting from the training may be stored in a memory for later retrieval and use during evaluation. The set of weights may be stored in memory to be associated with other information including the character rig, skeletal hierarchy, bone/vertex assignments, and the like. The stored information may be provided to another party for real-time evaluation of the deformation approximations of the character mesh at another time, location, or terminal, such as a client terminal. The stored information may be provided to another party via a network, such as the Internet, or by other computer readable means known to those of ordinary skill in the art. In yet other embodiments, the set of weights may be determined and the deformation approximation evaluations may be performed inline in real-time. In such embodiments, the set of weights may also be stored in and retrieved from a memory, including RAM or ROM of computer hardware memory. It will be understood by those or ordinary skill in the art that the above discussion is not to be considered limiting, and the present disclosure considers additional and alternative embodiments than those discussed herein, including implementations involving cloud computing, web-based applications, and the like.

The embodiments discussed above include approximation of the non-linear deformation function, however an additional improvement in computational efficiency may be made by removing unnecessary computations. By identifying and removing extra calculations from the models, the speed of the approximation may be increased without significantly affecting the accuracy. These improvements may include reducing the total number of models trained and reducing the size of the inputs, outputs, and/or hidden layers per model.

In one example, one model is trained per bone; however, some bones have few vertices assigned to it. As a result, some models may be trained to predict the deformation of only a small set of vertices thereby having little impact to the overall character pose. Optimization of the approximation computations may be available by disregarding bones having only a few vertices, and reassigning the few vertices to neighboring bones. To remove these types of models, in one embodiment, bones may be removed one at a time from consideration until the average vertex assignment error discussed above with respect to bone assignment reaches a threshold value.

In some embodiments, the threshold value may be determined and predefined based on an optimally determined tradeoff between computational efficiency and visual accuracy of the approximated deformation. In other embodiments, the threshold value may be adjusted, either manually by an artist or other operator, or automatically based on certain determined parameters including number of bones removed, location of reassigned vertices, relative positioning of removed bones, and the like.

In one example of the above optimization method, to remove networks approximating small subsets of vertices, bones may be greedily removed from consideration one at a time. Greedy removal of bones may include identifying a bone determined as a best choice for removal using a particular determination without reinserting the removed bone back into consideration, regardless of the evaluation result after removal. To identify which bone to remove during each iteration, the total number of vertices assigned to each bone may be considered. Thus in one example, the bone with the fewest number of vertices assigned may be removed, and the vertices assigned to the removed bone may be reassigned to the next best bone, as determined by an average vertex assignment error e, given by the following equation:

$$e = \sum_{i=1}^{n} \| V^i - \hat{d}(S^i) \|_F^2$$

At each iteration, average vertex assignment error may be determined, and no additional bones may be removed when the average vertex assignment error reaches a threshold value, or $e_i > \tau e_0$, given a scaling factor $\tau > 0$. In some preferred embodiments, optimization using threshold values wherein $\tau \in (1.1, 1.5)$ resulted in efficient approximation calculations while maintaining acceptable visual mesh deformation as compared to the ground truth deformation.

During optimization, higher values of $\tau$ may lead to fewer models that need to be trained, however fewer models could lead to larger approximation errors. If a small value of $\tau$ is chosen, then more models will used, but the approximation errors would be smaller. Thus, the choice of $\tau$ provides a trade-off between speed and accuracy in the approximation.

In addition to reducing the number of neural networks that need to be trained, in some embodiments optimization may also be accomplished by reducing the amount of computation performed in each model. As discussed above for feed-forward neural networks, output for some layer i is computed wherein $x_{i+1} = f(W_i x_i + b_i)$, where $W_i$ and $b_i$ are unknown parameters that are learned when the model is trained. In one embodiment, improvement focuses attention on the per-layer calculations in the neural network in the layer i output equation above. The most time-consuming part of this equation is the matrix-vector product involving $W_i$. If this matrix is m×n, then the complexity of calculating the product is on the order of O (nm), and specifically, the product may require m(2n−1) flops. Therefore, to reduce the computational complexity of evaluating the neural network models, it is advantageous to reduce the sizes of the weight matrices $W_i$.

Reducing the size of weight matrices by decreasing the number of hidden nodes may be considered. This reduction can be accomplished by using fewer hidden layers in each model or decreasing the size of each hidden layer. However, if the number of inputs and outputs is significantly larger than number of nodes per hidden layer, then reducing the size of these layers may have less influence on the total computational cost for evaluating the model.

For example, given a model approximating the deformation of 200 vertices with 100 input bones, the model will take as inputs 1200 values (12 values for each bone provided a 3×3 rotation matrix plus a three-dimensional translation vector) and output 600 values (3 for each vertex). If the model has 3 hidden layers, each with 128 nodes, then the total number of flops from the matrix vector multiplication will be 1200(2*128−1)+2*128(2*128−1)+128(2*600−1) for a total of 524,752 flops.

If, for example, the number of hidden nodes per layer were reduced to 64, then the total number of flops would be about half of the total when using 128 nodes.

However, reducing the size of the hidden layers may affect the accuracy of the approximation. Therefore, reducing the size of the hidden layers can reduce the total computation required at the cost of accuracy. Continuing the example above, if one of the hidden layers is removed, a total of 32,512 flops would be removed from the computation. This amount is small compared to the total number of flops, and therefore reducing the number of hidden layers would not provide significant reductions in total computational cost of evaluating the model.

One example of optimization of the embodiments of the present disclosure involves removing computations from the neural network to achieve gains in computing speed. In this case, the approximations being performed by each neural network are considered and identified as being associated with a particular region of the character mesh. In most cases, any transformations which are applied to another region of the mesh located away from the first region will likely have little to no effect on the vertex approximations at the first region.

In other words, approximations of deformations for vertices located at a right foot of a character likely will not need to consider any transformations being applied to a left hand of the character as the two regions are largely separated and unrelated. Thus, to optimize the approximations, the input weight matrices Wi to a particular neural network corresponding to a bone at the right foot may be significantly reduced by disregarding regions of the mesh which have no effect on the right foot, such as those associated with the left hand.

In other words, a large amount of computation is involved in evaluating the first layer of the network because the size of the input is large. For some set of vertices $P_i$, a model approximates the local nonlinear deformation $f_{P_i}(S)$. Because of the way that the vertices $P_i$ were chosen, this deformation function may depend only on the local bones near the vertices in this set. Therefore, the function $f_{P_i}(S)$ may not use all of the input bones from the skeleton.

Assuming access to the deformation function d(S), the bones that affect the vertices in $P_i$ may be identified by perturbing the bones one at a time and recording which bones caused a change in the function $f_{P_i}(S)$. This process may be repeated with multiple example poses to ensure that all bones affecting the vertices in $P_i$ are identified. A subset of the skeleton $S_{P_i}$ may be defined as the set of all bones that influence any of the vertices in $P_i$. This defined subset of bones is used as the input to the model approximating the nonlinear deformation function for the vertices in Pi. In some examples, optimized rigs originally having between 100 and 200 bones resulted in each set of vertices being associated with a subset of around 10 bones that contributed to their deformation. The subset may be precomputed and stored for later use after the vertex-bone assignments are determined. By using this reduced input set, the computational cost of the first layer for each model can be significantly reduced.

In another embodiment, another optimization potential in the network evaluation may be the output layer. The output of a trained neural network may contain 3 values per vertex in the form of an offset vector, and in some examples, there may be on the order of hundreds of vertices that each model approximates. Unlike the input layer, each dimension of the output needs to be predicted. However, these outputs are highly correlated with each other. For example, if the deformation of one bone causes a region of the mesh to stretch, then all of the vertices of the region will move in roughly the same direction. With this in mind, a linear dimensionality reduction method may be utilized to reduce the size of the output. Using the training data for the model, principal component analysis may be performed on each matrix $V_{P_i}^{1 \cdots n}$ containing all of the outputs for the model in the training set $P_i$ across all n poses in the training set. The matrix $V_{P_i}^{1 \cdots n}$ is a $3|P_i| \times n$ matrix where there are $|P_i|$ vertices and n training examples.

Next the number of principal components may be determined for use in the linear transformation T that maps the set of vertex positions to a lower dimensional space. Principal component analysis provides a transformation T that maps the set of vertex positions to a lower dimensional space. The number of principal components to be used in the linear transformation T must then be determined. Keeping more components will increase the accuracy of the model at the cost of adding more flops to the computation. The number of components to keep may be determined by finding the minimum amount that keeps the reconstruction error $\|V_{P_i}^{1 \cdots n} - T^T T V_{P_i}^{1 \cdots n}\|_F^2$ below a user specified threshold. In some embodiments, the threshold may be defined by an artist or other operator, and in other embodiments, the threshold may be predefined or determined automatically based on various considerations.

In some embodiments, keeping the average per-vertex distance error below $10^{-2}$ may be sufficient to maintain the accuracy of the approximation without adding too many principal components to the transformation. Further in some embodiments, on average, 20-30 principal components per model may provide a reasonable balance between speed and accuracy. Once the transformation T is determined, it can be appended to the end of the neural network model as a final dense layer with a linear activation. When the model is trained, the weights of this last layer are not optimized to maintain the transformation.

Based on the above disclosure, it will be understood by one of ordinary skill that embodiments of the present disclosure are able to learn a large range of deformations given a character's existing underlying skeleton and original deformation function training data. Using linear deformations combined with approximations for non-linear local deformations, embodiments of the present disclosure may result in significant computational time improvements while maintaining a high level of accuracy as compared with the original deformation function. Furthermore, because the disclosed embodiments use the underlying skeleton of a character rig without modification, an animator, without any extra work, can author new poses that can be accurately approximated.

In some cases, the embodiments of the present disclosure may achieve evaluation time speed improvements up to a factor of 10 as compared with existing methods using the original deformation function based on a model for a single input pose.

Additionally, multiple input poses can be passed into the model for a single evaluation, which would utilize matrix-matrix multiplications through the neural network as opposed to matrix-vector. Evaluating the model with multiple input poses would have a faster run-time per input compared with evaluation on a single input pose at a time. This speed increase comes from matrix-matrix multiplication running faster than separate matrix-vector multiplications for each input when using highly optimized linear algebra packages. Also, even larger performance gains may be observed when considering parallel computing implementations. This greater increase in speed may be attributed to the better use of CPU cores for matrix multiplications in the embodiments of the present disclosure as compared to existing techniques.

Figure 4A:
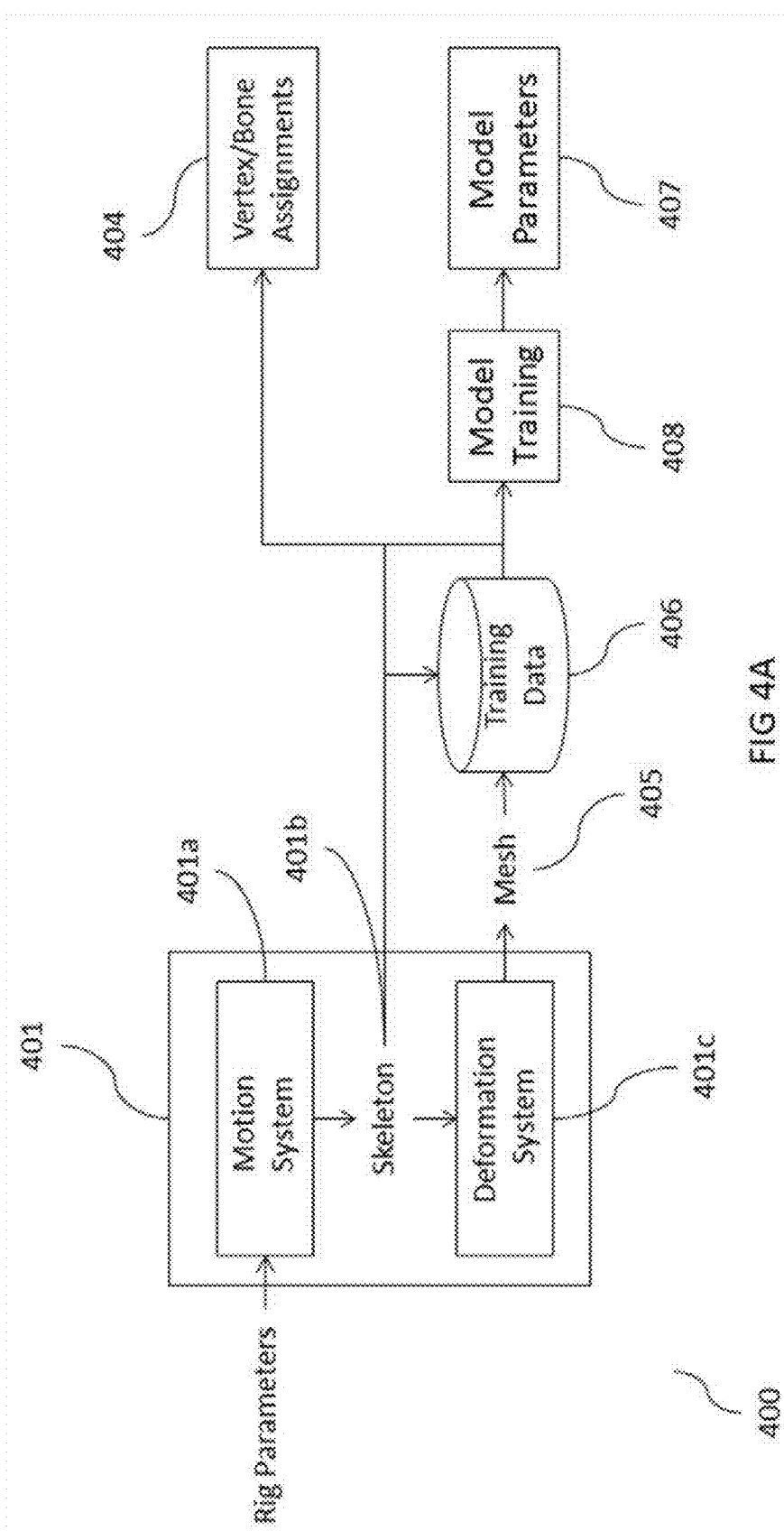
FIG. 4A is a flowchart showing a method according to an embodiment of the present disclosure.

Referring now to FIG. 4A, a simplified flowchart is depicted showing an embodiment of the present disclosure corresponding to training a deformation system of a character rig to allow for deformation approximations. The non-linear approximations may be learned from a set of training examples generated from the original rig evaluation function.

In some embodiments, the rig evaluation engine 401 of a character may be comprised of a motion system 401a, a skeleton of the character 401b, and a deformation system 401c. The rig evaluation engine 401 may be used to calculate a final deformation of the full mesh function utilizing high performance computing hardware. The original deformation function or the ground truth deformation may be determined by the rig evaluation system 401.

In embodiments of the present disclosure, the rig evaluation engine 401 may be used to generate training data 406 of a large number of mesh representations 405 of the character based on example poses. The training data 406 may be based on a large number of randomized poses of the character that are evaluated using the rig evaluation engine 401. In other embodiments, the training data 406 may be based on a number of predefined poses of the character that cover a full range of movement or combinations of movement of each component of the character. In yet other embodiments, the training data 406 may include both randomized and predefined poses of the character.

In some embodiments, the training data 406 may be used to generate vertex/bone assignments 404. As discussed above, each vertex of the mesh 405 may be assigned to a corresponding bone of skeleton 401b which best matches the vertex's deformation across multiple poses, as determined by the training data 406. To achieve this, the ground truth deformations for the vertices resulting from a set of a large number of poses may be obtained using the rig evaluation engine 401. The set of poses may consist of random poses of the character, or they may consist of a wide range of predefined poses of the character, or a combination of both in some embodiments. In other embodiments, the vertex/bone assignments 404 may be obtained using mesh deformations performed specifically for the purpose of determining the bone/vertex assignments 404, independent from the training data 406 used for model training 408.

With respect to the vertex/bone assignment 404 determinations, based on the training data 406, linear deformations of each vertex are evaluated with respect to transform applied to each bone, within the large number of random poses used for obtaining the ground truth deformation values. A single bone is then identified for each vertex of the character mesh which results in the linear deformation of the vertex achieving a closest deformation—or smallest margin of error—as compared with the vertex's ground truth deformation for the same pose. Each vertex may be assigned to a single corresponding bone to generate the vertex/bone assignments 404. The vertex/bone assignments are input to the linear deformation determination 402 of the deformation approximation 410.

As shown in FIG. 4A, the training data 406 is also utilized for model training 408, where neural networks are trained to learn the deformations of vertices for each bone in the skeleton. The neural networks in model training 408 may be configured to learn the non-linear deformations for each vertex from the linear deformation associated with the bone transform defined for each mesh pose of the training data 406. The model training 408 results in the determination of model parameters 407, including values for weight matrices $W_i$ and neural network parameter $b_i$, which are learned when the model is trained. The vertex/bone assignments 404 and model parameters 407 may be output directly to a deformation approximator, provided to another party for approximating deformations, and/or may be stored in a memory for retrieval and use for deformation approximations given the same and skeleton 401b.

Figure 4B:
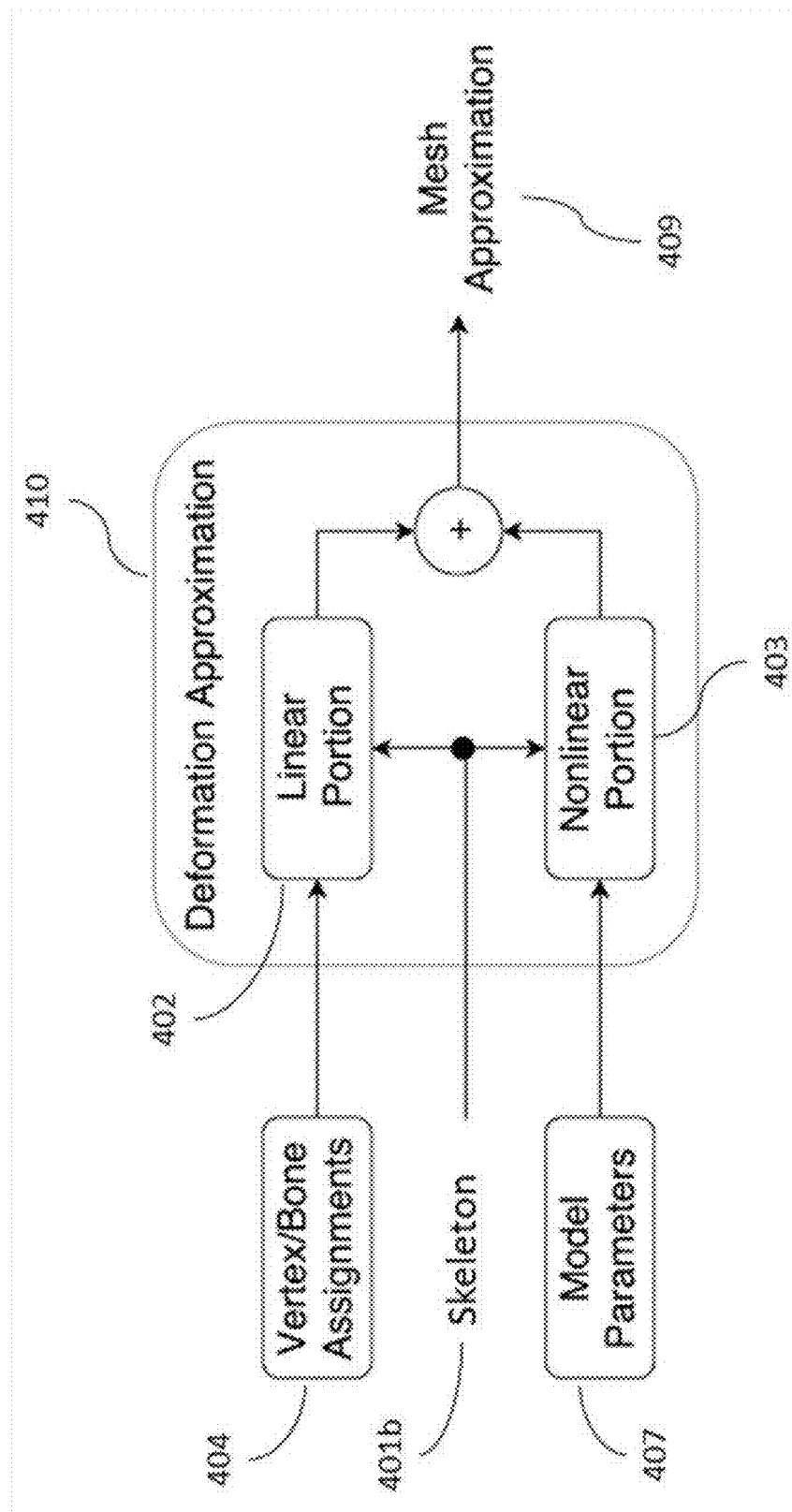
FIG. 4B is a flowchart showing a method of approximating deformations according to an embodiment of the present disclosure.

Referring now to FIG. 4B, an embodiment is shown for generating mesh approximations 409 given the vertex/bone assignments 404, model parameters 407, and the skeleton 401b which were discussed for FIG. 4A. As discussed, the vertex/bone assignments 404, model parameters 407, and skeleton 401b may be provided directly from the operations corresponding to the flowchart in FIG. 4A, or they may be received or retrieved from a memory to determine the mesh approximations 409.

In some embodiments, the vertex/bone assignments 404, skeleton 401b, and model parameters 407 may be input to the deformation approximator 410. The deformation approximator 410 may include a linear portion 402 and a non-linear portion 403. The non-linear deformation determination 403 may be executed concurrently with the linear deformation determination 402 as they may be executed independently. In other embodiments, the non-linear deformation determination 403 may be executed prior to or following the linear deformation determination 402.

Utilizing the vertex/bone assignments 404 and the skeleton 401b, the linear portion 402 may determine a linear deformation position of various vertices given a real-time transformation of an associated bone defined by the vertex/bone assignments 404. The non-linear portion 403 may utilize the skeleton 407 and the model parameters 407, which includes the weight matrices determined from training the neural networks based on the training data, to determine a non-linear deformation position of the various vertices given the real-time transformation of the associated bone based on the approximation function provided by the weighted neural networks.

The combination of the linear deformation determination 402 and the non-linear deformation determination 403 in the deformation approximator 410 results in the mesh approximation of the original deformation function.

Figure 5:
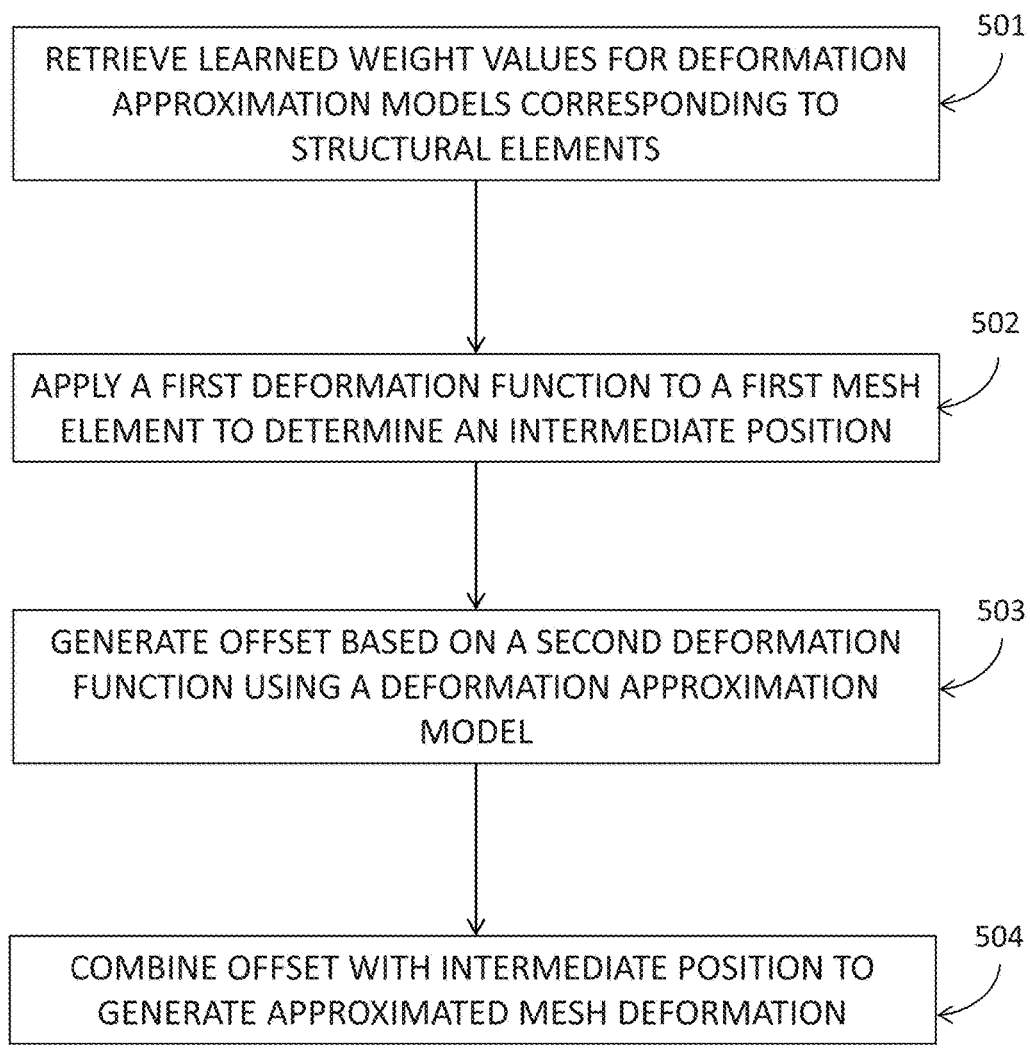
FIG. 5 is a flowchart showing a method according to an embodiment of the present disclosure.

Referring now to FIG. 5, a flowchart 500 depicting an example of an embodiment of the present disclosure is provided. At block 501, the weight values based on the trained neural networks are retrieved for the particular character rig. The weight values may be retrieved from a memory at a terminal or the weight values may be retrieved from another terminal or another party, via a communication network or by storage medium.

In other embodiments, the neural networks may be trained and the weight values determined in line with evaluation of the deformation approximations, and thus the weight values may be stored in a memory and retrieved for executing the approximation evaluations. At block 502, a first linear deformation function may be applied to a mesh element or vertex to determine an intermediate linear deformation position of the first mesh element based on the transform to the first structural element or bone.

As discussed in the embodiments, each vertex of the character mesh may be assigned to a single bone of the skeleton identified using a minimum vertex assignment error equation. The minimum vertex assignment error may compare the original deformation function with the linear deformation of the vertex when assigned to each bone, and select the bone resulting in the minimum difference.

At block 503, an offset may be generated using a second deformation function for the mesh element by the trained neural network, wherein the offset results in an approximate non-linear deformation of the mesh element from the intermediate linear deformation position. The neural network may use the retrieved weight values which were determined during model training using the training data, as discussed in FIG. 4A.

Using the generated offset, at block 504, the offset of the second deformation function is combined with the intermediate linear deformation position of the first linear deformation function to generate an approximated mesh deformation which includes the mesh element positioned at the approximated target position.

Utilizing embodiments of the present disclosure, accurate approximation of deformations may be achieved in a significantly less amount of time using significantly less amount of computing resources as compared with the original deformation functions requiring far more time and computing resources. Particularly in comparison with other known deformation techniques, embodiments of the present disclosure achieve far more accurate results in less computing time when compared with the ground truth deformation results.

Figure 6:
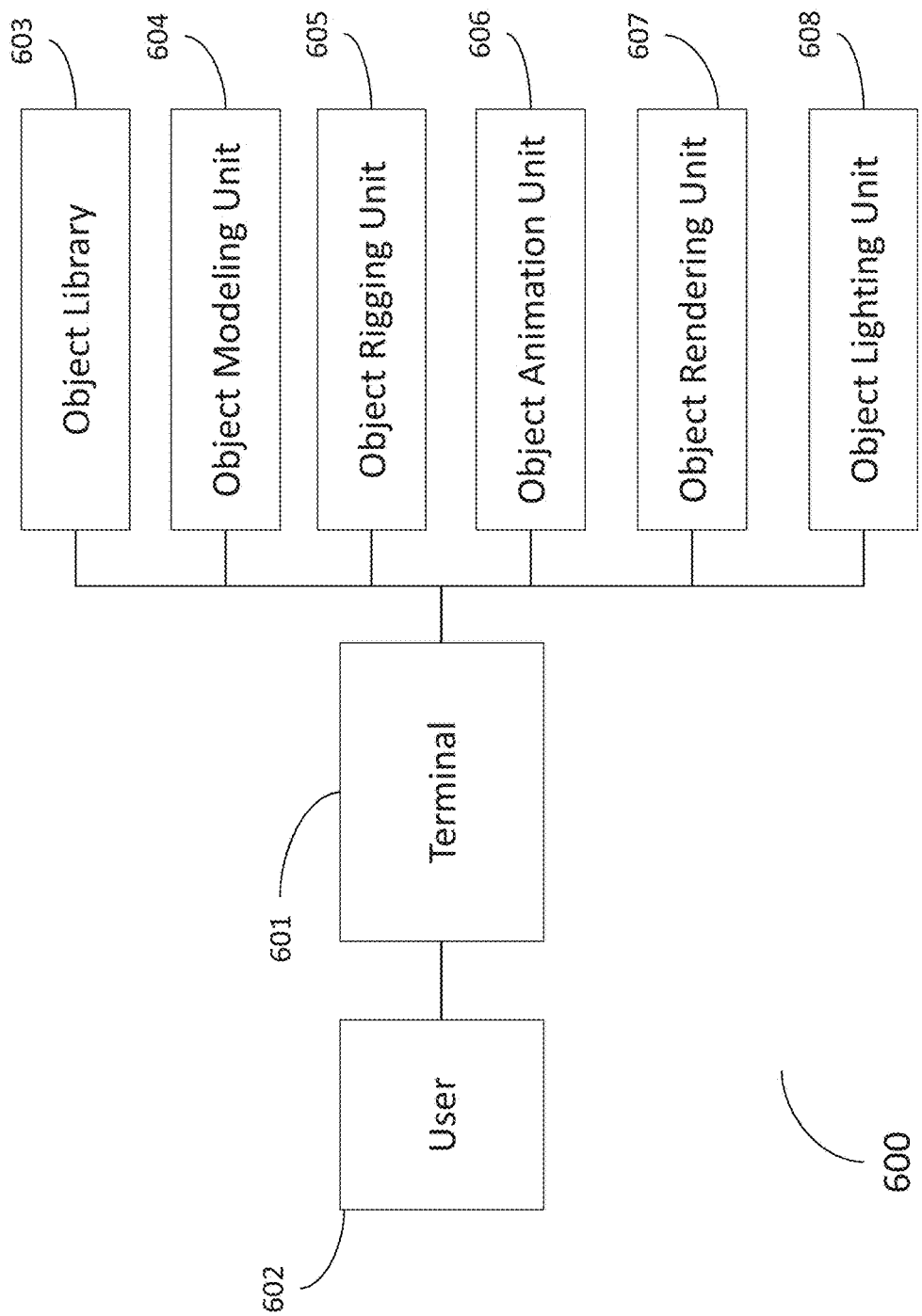
FIG. 6 is a diagram of a system implemented according to an embodiment of the present disclosure.

Referring now to FIG. 6, a simplified block diagram of a system 600 for creating computer graphics imagery (CGI) and computer-aided animation is shown that may implement or incorporate various embodiments of the present disclosure. The system 600 may include one or more terminals 601. The one or more terminals 601 may include hardware and software elements configured for designing CGI and assisting with computer-aided animation. The terminals 601 may be implemented as a single computing device or a set of one or more computing devices, corresponding to computer hardware and/or software.

Examples of terminals 601 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 601 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 600, a user 602 may utilize the one or more terminals 601 to design, create, or modify objects within a computer-generated interface displayed on display associated with the terminal 601.

The terminal may implement, include, or otherwise be in operable communication with, systems and units including object library 603, object modeling unit 604, object rigging unit 1605, object animation unit 606, object rendering unit 607, and object lighting unit 608. Object library 603 may include software and/or hardware elements configured for storing and accessing information related to objects to be accessed, requested, retrieved, and/or used by the one or more terminals 601 to design, create, and modify 3D models of objects in the CGI and animation processes.

Object modeling unit 604 may include software and/or hardware elements and information to be accessed, requested, retrieved, and/or used by the one or more terminals 601 to sculpt and design the 3D model to take on the desired appearance as instructed by user 602, or other terminal operator during the CGI and animation process.

Object rigging unit 605 may include software and/or hardware elements and information to be accessed, requested, retrieved, and/or used by the one or more terminals 601 to design, create, or modify components of 3D models to define articulation points and movement ranges of various elements of the 3D model.

Object animation unit 606 may include software and/or hardware elements and information to be accessed, requested, retrieved, and/or used by the one or more terminals 601 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 607 may include software and/or hardware elements and information to be accessed, requested, retrieved, and/or used by the one or more terminals 601 to design, create, or modify a final appearance of the animated 3D model, including generating one or more images of one or more computer-generated objects, including textures, colors, rigging, controls, and the like.

Object lighting unit 608 may include software and/or hardware elements and information to be accessed, requested, retrieved, and/or used by the one or more terminals 601 to design, create, or modify lighting aspects of a 3D model and animated scenes, including defining lighting sources, shading, reflections, refractions, textures, colors, and the like.

The one or more terminals 601 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 603, object modeling unit 604, object rigging unit 605, object animation unit 606, object rendering unit 607, object lighting unit 608, and the like. The one or more terminals 601, the one or more server computers, or any other aspect of the system 600, may be associated or coupled with a display configured to display information, including a displayed interface for displaying, performing, executing, instructing, reviewing, and/or selecting operations of the present disclosure.

Figure 7:
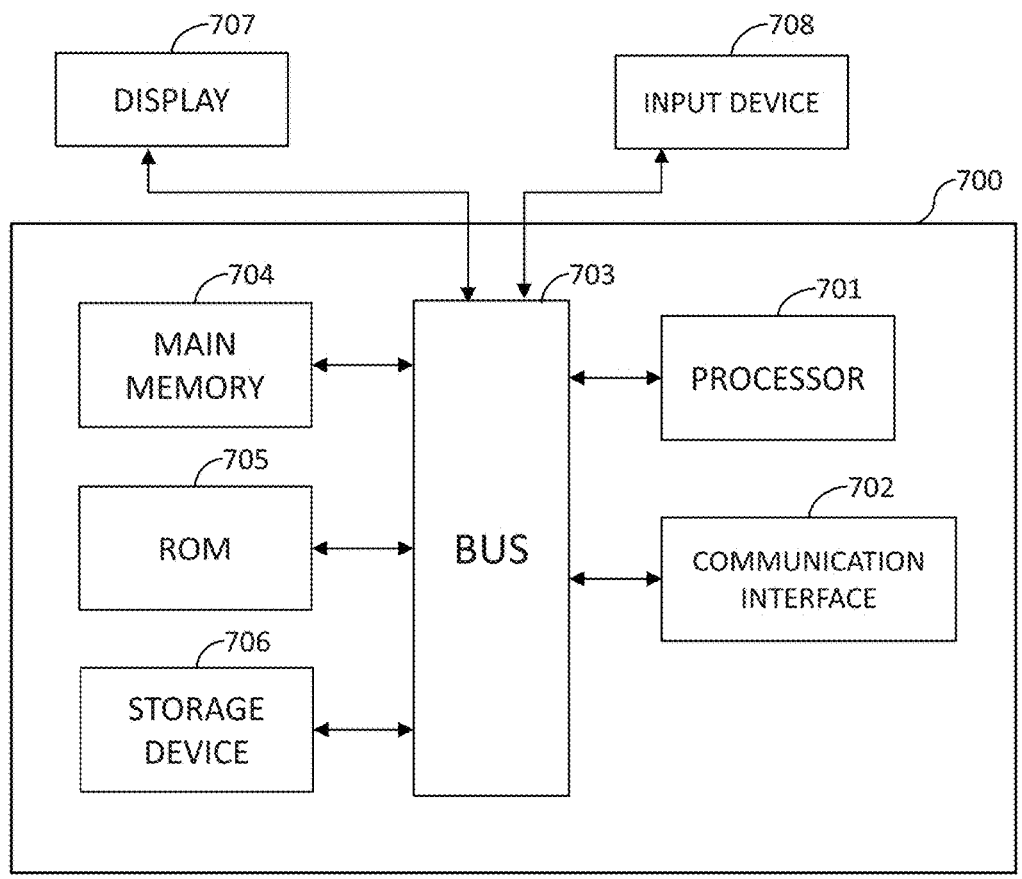
FIG. 7 is a diagram of an apparatus implemented according to an embodiment of the present disclosure.

Referring to FIG. 7, an illustration of an example computer 700 is provided. One or more of aspects of the system 600 discussed above in FIG. 6, such as the one or more terminals 600 or the one or more server computers, may be configured as or include such a computer 700. In selected embodiments, the computer 700 may include a bus 703 (or multiple buses) or other communication mechanism, a processor 701, main memory 704, read only memory (ROM) 705, one or more additional storage devices 706, and/or a communication interface 702, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 703 or other communication mechanism, including multiple such buses or mechanisms, may support communication of information within the computer 700. The processor 701 may be connected to the bus 703 and process information. In selected embodiments, the processor 701 may be a specialized or dedicated microprocessor configured to perform particular tasks in accordance with the features and aspects disclosed herein by executing machine-readable software code defining the particular tasks. Main memory 704 (e.g., random access memory—or RAM—or other dynamic storage device) may be connected to the bus 703 and store information and instructions to be executed by the processor 701. Main memory 704 may also store temporary variables or other intermediate information during execution of such instructions.

ROM 705 or some other static storage device may be connected to a bus 703 and store static information and instructions for the processor 701. An additional storage device 706 (e.g., a magnetic disk, optical disk, memory card, or the like) may be connected to the bus 703. The main memory 704, ROM 705, and the additional storage device 706 may include a non-transitory computer-readable medium holding information, instructions, or some combination thereof, for example instructions that when executed by the processor 701, cause the computer 700 to perform one or more operations of a method as described herein. A communication interface 702 may also be connected to the bus 703. A communication interface 702 may provide or support two-way data communication between a computer 700 and one or more external devices (e.g., other devices contained within the computing environment).

In selected embodiments, the computer 700 may be connected (e.g., via a bus) to a display 707. The display 707 may use any suitable mechanism to communicate information to a user of a computer 700. For example, the display 707 may include or utilize a liquid crystal display (LCD), light emitting diode (LED) display, projector, or other display device to present information to a user of the computer 700 in a visual display. One or more input devices 708 (e.g., an alphanumeric keyboard, mouse, microphone, stylus pen) may be connected to the bus 703 to communicate information and commands to the computer 700. In selected embodiments, one input device 708 may provide or support control over the positioning of a cursor to allow for selection and execution of various objects, files, programs, and the like provided by the computer 700 and displayed by the display 707.

The computer 700 may be used to transmit, receive, decode, display, or the like one or more video files. In selected embodiments, such transmitting, receiving, decoding, and displaying may be in response to the processor 701 executing one or more sequences of one or more instructions contained in main memory 704. Such instructions may be read into main memory 704 from another non-transitory computer-readable medium (e.g., a storage device).

Execution of sequences of instructions contained in main memory 704 may cause the processor 701 to perform one or more of the procedures or steps described herein. In selected embodiments, one or more processors in a multi-processing arrangement may also be employed to execute sequences of instructions contained in main memory 704. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 701, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 702 may provide or support external, two-way data communication to or via a network link. For example, a communication interface 702 may be a wireless network interface controller or a cellular radio providing a data communication network connection. Alternatively, a communication interface 702 may comprise a local area network (LAN) card providing a data communication connection to a compatible LAN. In any such embodiment, a communication interface 702 may send and receive electrical, electromagnetic, or optical signals conveying information.

A network link may provide data communication through one or more networks to other data devices (e.g., one or more terminals 601 as shown in the system 600). For example, a network link may provide a connection through a local network of a host computer or to data equipment operated by an Internet Service Provider (ISP). An ISP may, in turn, provide data communication services through the Internet. Accordingly, a computer 700 may send and receive commands, data, or combinations thereof, including program code, through one or more networks, a network link, and communication interface 702. Thus, the computer 700 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for generating approximated mesh deformations of a model comprising one or more mesh elements and a first structural element of a plurality of structural elements, the method comprising:
   applying a first deformation function to the one or more mesh elements to determine an intermediate position of the one or more mesh elements based on a transform applied to the first structural element, wherein the one or more mesh elements are assigned to the first structural element;
   generating an offset, based on a second deformation function, for the one or more mesh elements using a deformation function approximation model, wherein the offset is a positional offset of the one or more mesh elements from the intermediate position to a target position corresponding to the transform applied to the first structural element; and
   generating a combined mesh deformation for the one or more mesh elements by combining the intermediate position of the first deformation function and the offset of the second deformation function.

2. The method of claim 1, wherein:
   each of the plurality of structural elements is assigned with at least one mesh element; and
   a corresponding deformation function approximation model is provided for each of the plurality of structural elements.

3. The method of claim 1, wherein the plurality of structural elements correspond to bone representations of a skeleton of the model and the one or more mesh elements correspond to vertices of a mesh of the model.

4. The method of claim 1, wherein the deformation function approximation model corresponds to a neural network using a learned weight value for the second deformation function.

5. The method of claim 4, wherein the deformation function approximation model is based on a learned weight value that is determined by training the neural network on a set of training data comprising deformation positions of the one or more mesh elements defined with respect to the first structural element resulting from various transforms applied to the first structural element.

6. The method of claim 4, wherein an input to the neural network includes a selected subgroup of the plurality of structural elements, wherein a transform applied to each of the subgroup of structural elements affects a position of the one or more mesh elements.

7. A machine-readable non-transitory medium having stored thereon machine-executable instructions for generating approximated mesh deformations of a model comprising one or more mesh elements and a first structural element of a plurality of structural elements, wherein the instructions comprise:
   applying a first deformation function to the one or more mesh elements to determine an intermediate position of the one or more mesh elements based on a transform to the first structural element, wherein the one or more mesh elements are assigned to the first structural element;
   generating an offset, based on a second deformation function, for the one or more mesh elements using a deformation function approximation model, wherein the offset is a positional offset of the one or more mesh elements from the intermediate position to a target position corresponding to the transform applied to the first structural element; and generating a combined mesh deformation for the one or more mesh elements by combining the intermediate position of the first deformation function and the offset of the second deformation function.

8. The machine-readable non-transitory medium of claim 7, wherein:
each of the plurality of structural elements is assigned with at least one mesh element; and
a corresponding deformation function approximation model is provided for each of the plurality of structural elements.

9. The machine-readable non-transitory medium of claim 7, wherein the plurality of structural elements correspond to bone representations of a skeleton of the model and the one or more mesh elements correspond to a vertices of a mesh of the model.

10. The machine-readable non-transitory medium of claim 7, wherein the deformation function approximation model corresponds to a neural network using a learned weight value for the second deformation function.

11. The machine-readable non-transitory medium of claim 10, wherein the learned weight value is determined by training the neural network on a set of training data comprising deformation positions of the one or more mesh elements defined with respect to the first structural element resulting from various transforms applied to the first structural element.

12. The machine-readable non-transitory medium of claim 10, wherein an input to the neural network includes a selected subgroup of the plurality of structural elements, wherein a transform applied to each of the subgroup of structural elements affects a position of the one or more mesh elements.

13. A terminal for generating approximated mesh deformations of a model comprising one or more mesh elements and a first structural element of a plurality of structural elements, the terminal comprising:
a display configured to display information; and
at least one controller configured to:
apply a first deformation function to the one or more mesh elements to determine an intermediate position of the one or more mesh elements based on a transform to the first structural element, wherein the one or more mesh elements are assigned to the first structural element;
generate an offset, based on a second deformation function, for the one or more mesh elements using a deformation function approximation model, wherein the offset is a positional offset of the one or more mesh elements from the intermediate position to a target position corresponding to the transform applied to the first structural element;
generate a combined mesh deformation for the one or more mesh elements by combining the intermediate position of the first deformation function and the offset of the second deformation function; and
cause the display to display an approximated mesh deformation of the model corresponding to the generated combined mesh deformation.

14. The terminal of claim 13, wherein:
each of the plurality of structural elements is assigned with at least one mesh element; and
a corresponding deformation function approximation model is provided for each of the plurality of structural elements.

15. The terminal of claim 13, wherein the plurality of structural elements correspond to bone representations of a skeleton of the model and the one or more mesh elements correspond to a vertices of a mesh of the model.

16. The terminal of claim 13, wherein the deformation function approximation model corresponds to a neural network using a learned weight value for the second deformation function.

17. The terminal of claim 16, wherein the learned weight value is determined by training the neural network on a set of training data comprising deformation positions of the one or more mesh elements defined with respect to the first structural element resulting from various transforms applied to the first structural element.

18. The terminal of claim 16, wherein an input to the neural network includes a selected subgroup of the plurality of structural elements, wherein a transform applied to each of the subgroup of structural elements affects a position of the one or more mesh elements.

19. A method for generating approximated mesh deformations of a model comprising a plurality of structural elements and a plurality of mesh elements, the method comprising:
associating one or more mesh elements of the plurality of mesh elements with a first structural element of the plurality of structural elements;
applying a transformation to the first structural element from a rest position;
identifying a linear deformation position of the one or more mesh elements resulting from the transformation applied to the first structural element;
generating weight values of a deformation approximation model associated with the first structural element based on determined target deformations of the one or more mesh elements given a plurality of poses of the model, wherein the deformation approximation model outputs an offset defined with respect to the first structural element; and
storing the generated weight values and associations of the one or more mesh elements with the first structural element to permit an approximated combined mesh deformation of the model to be generated based on an intermediate position of the first deformation function using the stored associations and the offset of the second deformation function using the stored generated weight values,
wherein the offset defines a deformation of the one or more mesh elements from the linear deformation position to a target deformation position of the one or more mesh elements corresponding to the transformation applied to the first structural element.

20. The method of claim 19, wherein associating the one or more mesh elements with the first structural element comprises:
determining target deformation positions of the one or more mesh elements given a plurality of poses of the model;
determining linear deformation positions of the one or more mesh elements for the plurality of poses given each association between the one or more mesh elements and each of the plurality of structural elements; and
selecting the first structural element for associating with the one or more mesh elements where a difference between the target deformation positions and the linear deformation positions of the one or more mesh elements using the first structural element is the smallest among the plurality of structural elements.

\* \* \* \* \*